Nov. 3, 1964    H. WAYMOUTH    3,154,984
INDEXING OR TABULATING MECHANISMS
Filed Feb. 27, 1962    3 Sheets-Sheet 1
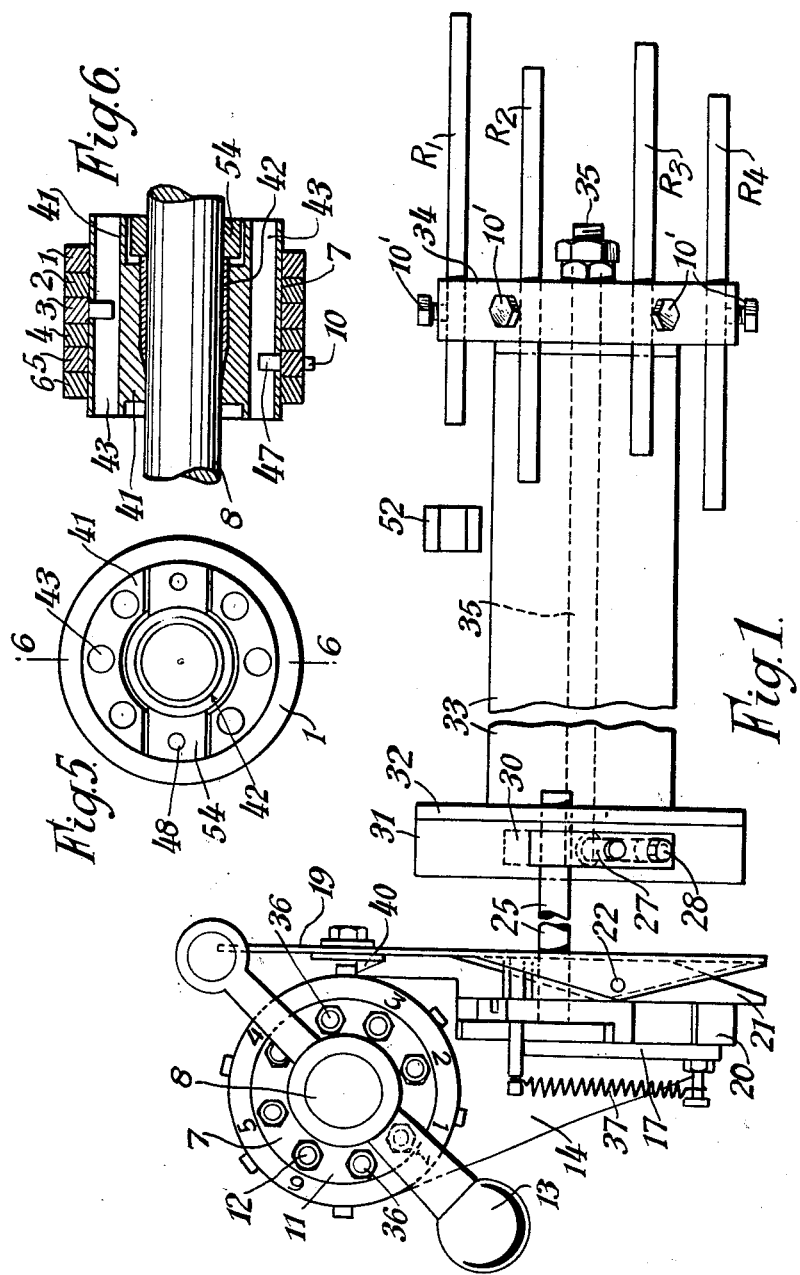
INVENTOR
HENRY WAYMOUTH
BY
ATTORNEY

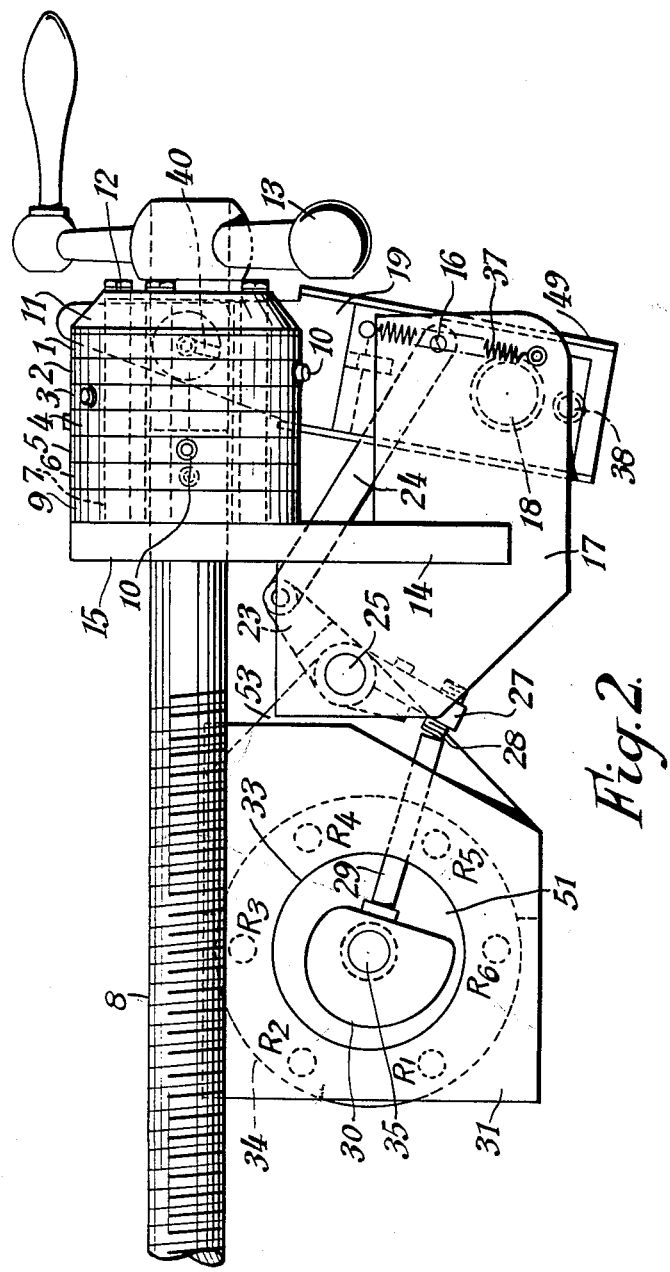

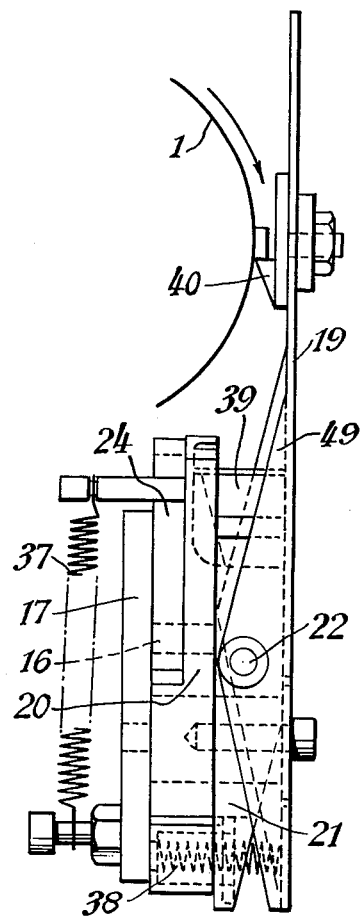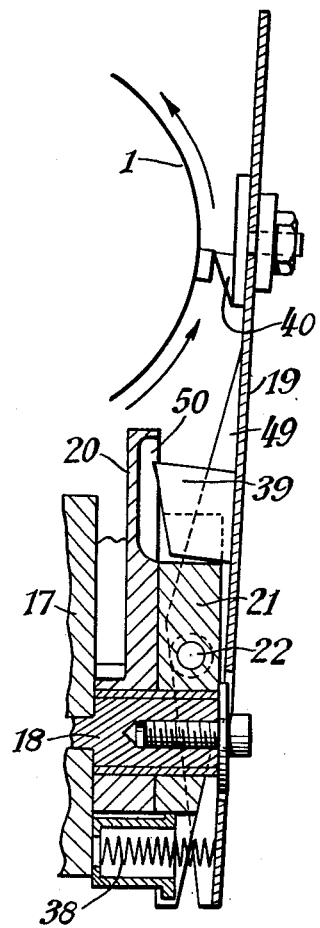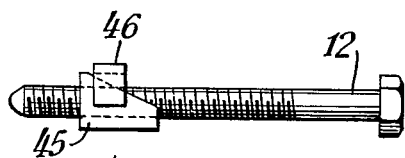

3,154,984
INDEXING OR TABULATING MECHANISMS
Henry Waymouth, Jubilee Works, Kings Road,
Godalming, England
Filed Feb. 27, 1962, Ser. No. 176,061
Claims priority, application Great Britain Mar. 8, 1961
10 Claims. (Cl. 82—34)

This invention relates generally to indexing mechanisms and, more particularly, to interconnected indexing or tabulating mechanisms. This invention is particularly, but not exclusively, applicable to machine tools where length, diameters, depth of cut or angles are fixed by requirements and are to be reproduced by the machine tool.

Stops are used on machine tools for limiting the length or depth of cut, but such stops are usually for one dimension only. The chief object of the present invention is to provide multiple interconnected stops, so that, once the mechanism is adjusted or set, complicated machining operations can be carried out and repeated without any reference to scales or measurements.

The invention is intended particularly for the making of a limited number of machined articles where the application of production methods or the use of an automatic machine are not justified. In such cases it may be necessary to perform a series of two or more operations each of which requires an accurate setting of some dimension. The invention provides means for pre-setting a number of combinations of dimensions in such a manner that no further measurements are required when producing a succession of identical articles.

The invention accordingly comprises an indexing mechanism in which two or more sets of measurements, when pre-set, are so associated that each predetermined measurement in one set is interconnected with a predetermined measurement in another set, whereby a machining or other operation may be repeated on a number of articles without further measuring.

In the embodiment of the invention shown by way of example in the accompanying drawings as applied to a lathe:

FIGURE 1 shows an external elevation as arranged at the front of a lathe;

FIGURE 2 shows an end elevation as viewed from the left of FIGURE 1;

FIGURE 3 shows an enlarged view of levers shown in FIGURE 1;

FIGURE 4 shows an enlarged vertical section corresponding with FIGURE 3;

FIGURE 5 shows an end elevation of part of a ring assembly;

FIGURE 6 shows a section on the line 6—6 of FIGURE 5;

FIGURE 7 shows a ring holding bolt assembly; and

FIGURE 8 shows a view of part of FIGURE 7.

The invention will now be described as applied to a lathe in which six turning operations are carried out, each operation involving diameter and length.

In operation the usual cross-slide screw 8 on the saddle (not shown) of a lathe is adjustable by rotation to any one of six positions and the longitudinal movement of the saddle is limited for each setting.

The apparatus comprises essentially (a) a stop ring assembly 7 which is held against longitudinal movement but may be pre-set by rotation to any one of six positions, (b) a longitudinal settings assembly giving six pre-set lengths, each corresponding to one of the diameter pre-settings, and (c) intermediate lever and cam connections.

The stop ring assembly 7, FIGURES 1, 2, 5 and 6, is mounted concentrically with the transverse feed screw 8 and is rotatable with the screw to six positions in succession, the amount of rotation for each adjustment corresponding with the depth of the corresponding cut. A mounting plate 15 for the stop ring assembly is secured by screw means to the part of the saddle of the lathe which normally supports the screw keep of the cross slide. The usual screw holes or studs may be utilised to hold the plate 15 in position.

The assembly includes a circular dial indicator 9 and six index rings 1 to 6 supported on the cylindrical outer surface of a core 41, FIGURES 5 and 6, by means of which the various movable parts of the assembly 7 are supported and clamped to the feed screw 8. The indicator 9 is fixed to the core and serves as a reference means by which each of the index rings may be set rotationally, to give a predetermined depth of cut.

The clamping means for connecting the core 41 to the feed screws consist of a collet 42 with a conical end engaging a similar conical surface in the core, the collet being slit lengthwise to facilitate gripping of the feed screw 8 when it is moved axially by tightening of the collet clamp 54. This tightening is effected by means of two set bolts 36 passing through holes 48 in the wings of the collet clamp 54 and screwed into the core. The heads of the bolts 36 enter clearance holes in the end cover plate 11. Closure of the cover plate 11 is finally carried out by the heads of the six locking screws 12 numbered 1 to 6 in FIGURE 1.

The rings 1–6 each carries an outwardly projecting stop or stud 10 and are independently rotatable to any setting position as required for any particular sequence of operations. When adjusted, each ring is secured in position by a locking screw 12 located in one of six spaced holes 43 drilled lengthwise in the core 41. Each screw 12 carries an index nut 45, FIGURE 7, having an outer sloping surface engaging a similar sloping surface on an index ring locking or clamping element 46, also shown in FIGURE 8. The outer surface of each locking element is curved to engage the inner surface of the ring, and it passes through a part circumferential slot 47 cut between each hole 43 for the screw 12 and the periphery of the core 41. The length of the slot is sufficient to allow free movement of element 46 when the screw 12 is slacked off and the ring with stop 10 can then be rotated to any position.

When the head of each screw 12 is tightened against the outside of the cover plate 11, the corresponding ring is set in position for operation. Screws 36 which are screwed into holes in the core pass through holes 48 in the two opposite wings of the collet clamp 54 which makes contact with one end of the collet 42 thus clamping the assembly to the feed screw 8 by which it is rotated as required in operation. The screws 12, when finally tightened, clamp all the rotationally adjustable parts together.

Each of the projecting studs 10 on the rings 1–6 engages in turn a stop 40 on a stop lever 19 shown in FIGURES 1, 2, 3 and 4. The lever 19 is mounted by means of a pivot 22 on a mounting 21 which, in turn, is rotatable on a spigot 18 secured to a stationary support plate 17 rigidly connected to a downward extension 14 of the mounting plate 15. Each vertical edge of the lever 19 is bent to form a stiffening flange 49 carrying the ends of the pivot 22. A light compression spring 38 is interposed between the lower end of the lever 19 and the support plate 17 and tends to move the stop 40 on the upper end of the lever 19 towards one of the rings 1–6. The movement is finally limited by engagement of the lever 19 with the mounting 21. The stop 40 on the lever 19 is reversible to prevent movement in either direction of the ring assembly 7 as required. When the assembly has been rotated by the spindle 8 and hand lever 13 to the preset position, the horizontal side of the stop 40 catches the stop or stud 10 on the ring and prevents its further rotation. This finishes the first setting by which the transverse cutting tool has been moved into position to give the predetermined depth of cut. A corresponding longitudinal feed movement of the saddle, then takes place and this movement when completed will permit rotation of the lever 19 so that the stop 40 is then coincident with the periphery of the next ring. The process is repeated in connection with further rings for turning further lengths of the job each of any predetermined diameter.

The movement of the lever 19 about the spigot 18 is effected by a slotted lever 20 also rotatable about the spigot 18 and movable with the lever 19 during the whole sequence of six operations. This joint movement of the two levers is brought about by engagement of the driving tongue 39 on the lever 19 with a slot or recess 50 in the upper part of the slotted lever 20.

Consideration will now be given to the synchronisation of the longitudinal settings with the transverse settings. Adjustment of a ring on the assembly 7 to give a new transverse setting, is effected simultaneously by length setting to limit the length of the turning operation.

Stop lever 19 and slotted lever 20 are both moved on from one ring to the next ring by a link 24. One end of this link is connected by a pivot 16 to the slotted lever 20 and the other end to a cam lever 23 connected to the adjacent end of the rocking shaft 25, this end being carried in a bearing in the support plate 17. The other end of the rocking shaft 25 is supported in an extension 53 from the bearing plate 32 which forms a cover for the housing 31. Shaft 25 forms the operative connection between the diameter settings of the assembly 7 and the length settings assembly. This latter assembly is entirely supported by the flange housing 31 which is bolted to the side of the lathe saddle and thus moves lengthwise with the saddle during a longitudinal turning operation.

A rocker arm 27 on the end of rocking shaft 25 adjacent the housing cover 31 makes contact with the cam follower 29 through adjusting screw 28. Cam 30 is mounted on the one end of the rod 35 and may be enclosed in the housing 31 but as shown is visible through an opening 51 in the housing; the other end of rod 35 is fixed to stop plate 34 which is thus rotatable with the cam 30. The outer end of the rod 35 is rotatably supported in a plate or support secured in the outer end of tube 33 which is supported in cantilever fashion from the flange 32 and the housing 31 mounted on the lathe saddle.

Stop plate 34 carries rods R1–R6 in such a way that they can be secured firmly as by set screws 10' after longitudinal adjustment. The rods are spaced equiangularly and the assembly, when rotated through an angle of 60°, or a multiple thereof, brings one of the rods into line with a stop 52 secured to the bed or frame of the lathe and stops the feed. The six rods are each adjusted to give the desired turning length on the job appropriate to a predetermined depth of cut as set by the ring assembly. The rotation of stop plate 34 is indexed by spring catches or other means to give six definite positions.

The cam 30 is of spiral type with uniformly increasing radius so that each rod R1–R6, when in line with the stop, adjusts the stop lever 19 to a position in which stop 40 is opposite the corresponding ring 1–6.

The machine, when in operation, is most conveniently re-set for fresh cutting operations by rotating the stop plate 34 until the appropriate stop rod is in line with the fixed stop 52. The cam 30 is thus turned through the same angle and the stop 40 is brought opposite the corresponding ring on the ring assembly through the cam follower 29, arm 27, shaft 25, arm 23 and link 24.

When the setting apparatus constituting the invention is set initially by associating any desired transverse and longitudinal settings, no further measurement or setting is necessary when carrying out a succession of similar turning operations.

To allow for tool wear, the ring assembly 7 can be released as a whole by unscrewing screws 36, which release the collet 12. The amount of the adjustment in diameter can be measured by the change in the reading of the dial indicator 9.

Where diameters vary by more than one turn of the cross-slide screw 8, the stop 40 can be lifted clear of the adjustable stops 10 by moving lever 19 against the spring pressure from spring 38.

To render the index mechanism inoperative, lever 19 with driving tongue 39 is moved away from the ring stops, until the lever can be rotated on pivot 18 to a rest position, so that stop 40 does not contact the studs 10 on the stop rings, nor is the movement of slotted lever 20 transmitted to the stop lever 19.

To render the length stops inoperative, the stop 52 is removed, or length stop plate 34 may be rotated into an inoperable position.

To summarise the process of initial setting, length stop plate 34 is indexed into the first position, and the stop position for the length is fixed by adjusting the stop rod R1 on the stop plate 34 in relation to the usual stop 52, which is fixed to the bed of the lathe. The gap between the stop 52 and the end of the stop rod gives the length of the cutting operation. The corresponding diameter is fixed by adjusting the tool by rotating handle 13 until stop 10 on the first ring 1 is brought into contact with the fixed stop 40 and is then locked in position by tightening the corresponding locking screw 12. Length stop plate 34 is then indexed into the second position, utilising the second stop rod R2. This adjustment automatically moves the stop lever 19 so that stop 40 can co-operate with the stop 10 on ring 2. The process is repeated for the remaining lengths and corresponding diameters to complete the initial setting. It will be seen that in the case of the mechanism shown, six diameters and six interconnected lengths can be set to stops in any desired order without any further setting of dimensions.

In each turning operation the stop rod selected from the range R1–R6 automatically brings the stop 40 on stop lever 19 into line with the corresponding stop ring from the range 1–6. The operator then rotates the feed screw 8 until the projecting stud 10 on the selected stop ring engages the stop 40 on lever 19. The turning operation can be carried out in any order, the spring-controlled lever 19 being readily movable, when required, so that the stop 40 is clear of any of the stops 10.

Spring 37 between the support plate 17 and the slotted lever 20 holds the cam follower 29 in contact with the cam 30 and takes up backlash in the connections.

What is claimed is:

1. Pre-setting mechanism for lathes or like machine tools having a bed, a feed screw and a saddle and in which two sets of measurements, each transverse relatively to the other set, are so associated when pre-set that each predetermined measurement in one set is operative only in conjunction with a predetermined measurement in the other set, comprising, in combination, a rotatable carrier securable to and movable longitudinally with the saddle of a lathe and pre-settable about a longitudinal axis of rotation, stop rods on the carrier parallel to said axis of rotation and spaced around the carrier on a circle concentric with the axis of rotation, each stop rod being pre-settable in position lengthwise of the carrier, a stop on the lathe bed engaged by the end of any of the stop rods in turn to terminate a cutting operation, transverse pre-setting means securable to the lathe feed screw and adjustable rotationally, said transverse pre-setting means including circular adjustable parallel rings each having on its periphery a stop pin, a limit stop adjustable transversely so as to lie in the plane of rotation of the pin on any one of the rings, and mechanical connections between the said rotatable stop rod carrier and the said limit stop of substantially constant ratio of movement.

2. Pre-setting mechanism for lathes or like machine tools having a feed screw and in which a lathe tool is moved by the saddle longitudinally and transversely of the work, comprising in combination a rotatable carrier movable longitudinally with the saddle and pre-set by an operator rotationally, stop rods on the carrier parallel to the axis of rotation and spaced around the carrier on a circle concentric with the axis of rotation, each stop rod being adjustable in position lengthwise of the carrier, a stop on the lathe bed engaged with any of the stop rods in turn, transverse pre-setting means adjustable rotationally with the lathe feed screw, said transverse pre-setting means including adjustable parallel rings each having on its periphery a stop pin by which it is pre-set rotationally, an adjustable limit stop movable into the path of any of the said stop pins on the rings, the said limit stop being connected to and moved correspondingly with the rotational movements of the said stop rod carrier.

3. Pre-setting mechanism as claimed in claim 1, wherein said transverse pre-setting means further includes a core mounting the means concentrically on the lathe feed screw, said core carrying a circular setting indicator, and said parallel rings being also mounted on said core for independent rotational adjustment.

4. Pre-setting mechanism, as claimed in claim 3, further comprising a screw bolt, a hole parallel to the feed screw in the core of greater diameter than said bolt and receiving the bolt, an elongated slot between said hole for the screw bolt and the periphery of the core, a clamping element in said slot and having an outer surface curved to engage the inner surface of an inclined inner surface ring, and an index nut with an inclined outer surface engaging said inclined inner surface of said clamping element, whereby to allow free rotational adjustment of the ring with its projecting stop, followed by tightening of said screw to clamp the ring in position on the core.

5. Pre-setting mechanism, as claimed in claim 3, further comprising means for clamping said core to the feed screw and including a collet with a conical end interposed between the surface of the feed screw and an enlargement in the bore of the core, such enlargement having a conical portion engaged by the conical end of the collet, the collet being longitudinally split to facilitate gripping, clamping means having a boss engaging the other end of the collect and two side wings, each of said wings having a through hole, and screws passing through said through holes to clamp the wings on to the core and thus clamp the collet in position.

6. Pre-setting mechanism as claimed in claim 4, in which an end cover is provided for the core, said screw bolt securing a ring in position also engaging said end cover.

7. Pre-setting mechanism as claimed in claim 2, in which a cam and follower mechanism is provided to transmit the rotation of the carrier carrying the stop rods to the adjustable limit stop engaging the stop pins on the rings of the transverse pre-setting means, said mechanism including a cam secured to the carrier and a follower connected to the limit stop to move the limit stop into the path of one of said ring stop pins.

8. Pre-setting mechanism as in claim 1 wherein said mechanical connections include a cam and cam follower mechanism secured to said carrier to rotate therewith, a lever pivoted to the bed of the lathe and supporting said limit stop at one end, said cam follower engaging the other end of said lever.

9. Pre-setting mechanism as in claim 8 wherein said limit stop and lever are movable in one direction only, said limit stop being reversible to allow rotation of said rings in either direction.

10. Pre-setting mechanism as in claim 8 wherein a spring is provided to maintain the said cam and cam follower in contact.

References Cited in the file of this patent

UNITED STATES PATENTS

| | | |
|---|---|---|
| 2,032,598 | Shaw | Mar. 3, 1936 |
| 2,305,756 | Antonelli | Dec. 22, 1942 |
| 2,600,213 | Darash | June 10, 1952 |
| 2,978,940 | Jeaneret | Apr. 11, 1961 |

FOREIGN PATENTS

| | | |
|---|---|---|
| 784,159 | Great Britain | Oct. 2, 1957 |